United States Patent
Yamamoto

(10) Patent No.: US 10,691,762 B2
(45) Date of Patent: Jun. 23, 2020

(54) METHOD OF OUTPUTTING RECOMMENDED ITEM AND RECOMMENDED ITEM OUTPUT DEVICE

(71) Applicant: FUJITSU LIMITED, Kawasaki-shi, Kanagawa (JP)

(72) Inventor: Tatsuya Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 402 days.

(21) Appl. No.: 15/258,083

(22) Filed: Sep. 7, 2016

(65) Prior Publication Data

US 2017/0098001 A1 Apr. 6, 2017

(30) Foreign Application Priority Data

Oct. 5, 2015 (JP) .................... 2015-197961
Jun. 24, 2016 (JP) .................... 2016-125300

(51) Int. Cl.
*G06F 16/248* (2019.01)
*G06F 16/9535* (2019.01)
*G06Q 30/06* (2012.01)
*G06F 16/9536* (2019.01)

(52) U.S. Cl.
CPC ........ *G06F 16/9535* (2019.01); *G06F 16/248* (2019.01); *G06F 16/9536* (2019.01); *G06Q 30/0631* (2013.01)

(58) Field of Classification Search
CPC combination set(s) only.
See application file for complete search history.

(56) References Cited

U.S. PATENT DOCUMENTS

| | | | |
|---|---|---|---|
| 9,104,701 B1* | 8/2015 | Phung | G06F 17/30256 |
| 2004/0249723 A1* | 12/2004 | Mayer | G06Q 30/0601 |
| | | | 705/80 |
| 2006/0036597 A1 | 2/2006 | Kobayashi | |
| 2011/0153598 A1 | 6/2011 | Kamimaeda et al. | |
| 2012/0066064 A1* | 3/2012 | Yoder | G06Q 30/00 |
| | | | 705/14.53 |
| 2013/0297447 A1* | 11/2013 | Sakata | H04N 21/4826 |
| | | | 705/26.7 |
| 2015/0032768 A1* | 1/2015 | Miller | G06Q 10/02 |
| | | | 707/769 |
| 2015/0073929 A1* | 3/2015 | Psota | G06Q 50/28 |
| | | | 705/26.2 |
| 2016/0092772 A1* | 3/2016 | Srivastava | G06F 16/951 |
| | | | 706/12 |

FOREIGN PATENT DOCUMENTS

| | | |
|---|---|---|
| JP | 2006-48320 | 2/2006 |
| JP | 2011-135183 | 7/2011 |
| JP | 2012-22365 | 2/2012 |

* cited by examiner

*Primary Examiner* — Shyue Jiunn Hwa
(74) *Attorney, Agent, or Firm* — Staas & Halsey LLP

(57) ABSTRACT

A method of outputting a recommended item implemented by a computer, the method includes: obtaining information on a search item selected by a user when the user searches for an item on an item search screen; storing the information on the search item obtained in the obtaining in a storage unit that stores information on a search item that a plurality of users have selected in the past with respect to each user; identifying a similar user to the user by referring to the storage unit; and outputting information on an item that the similar user has referred to in the past to the user as information on a recommended item.

16 Claims, 14 Drawing Sheets

FIG. 5A

<CHARACTERISTIC ITEM TABLE 21>

| INDEX | CHARACTERISTIC ITEM |
|---|---|
| A0 | HEAT CHARACTERISTIC |
| B0 | LIFETIME |
| C0 | FAILURE RATE |
| ⋮ | ⋮ |

FIG. 5B

<EVALUATION VALUE TABLE 22>

| USER | SYNCHRONIZA-TION FLAG | CHARACTERISTIC ITEM | | | | | |
|---|---|---|---|---|---|---|---|
| | | A0 | B0 | C0 | D0 | E0 | ⋯ |
| U0 | TRUE | 3 | 0 | 7 | 0 | 4 | ⋯ |
| U1 | FALSE | 0 | 2 | 5 | 3 | 5 | ⋯ |
| U2 | TRUE | 5 | 0 | 3 | 0 | 2 | ⋯ |
| ⋮ | ⋮ | ⋮ | ⋮ | ⋮ | ⋮ | ⋮ | ⋮ |

FIG. 5C

<WORKING TABLE 23>

| USER | CHARACTERISTIC ITEM | | | |
|---|---|---|---|---|
| | A0 | B0 | C0 | ⋯ |
| U0 | 3 | 0 | 7 | ⋯ |
| U2 | 5 | 0 | 3 | ⋯ |
| U5 | 2 | 0 | 4 | ⋯ |
| ⋮ | ⋮ | ⋮ | ⋮ | ⋮ |

FIG. 6A

<GROUP TABLE 24>

| GROUP | BELONGING USER | | | | |
|---|---|---|---|---|---|
| G0 | U0 | U2 | U5 | U10 | ... |
| G1 | U3 | U4 | U9 | | |
| G2 | U1 | U6 | U7 | U8 | ... |
| ⋮ | ⋮ | ⋮ | ⋮ | ⋮ | ⋮ |

FIG. 6B

<ACCESS HISTORY TABLE 25>

| USER | ITEM | | | | |
|---|---|---|---|---|---|
| U0 | IT0 | IT1 | IT3 | IT4 | ... |
| U1 | IT1 | IT7 | IT9 | IT10 | |
| U2 | IT1 | IT2 | IT3 | IT6 | ... |
| ⋮ | ⋮ | ⋮ | ⋮ | ⋮ | ⋮ |

FIG. 6C

<TIMER VARIABLE TABLE 26>

| USER | CHARACTERISTIC ITEM | TIMER VARIABLE |
|---|---|---|
| U0 | A0 | U0_A0_tm |
| | B0 | U0_B0_tm |
| | C0 | U0_C0_tm |
| U1 | D0 | U1_D0_tm |
| ⋮ | ⋮ | ⋮ |

FIG. 12

| USER | AGE | PURCHASE DATE | TYPE | MATE-RIAL | SIZE | COLOR |
|---|---|---|---|---|---|---|
| A | 30 | 2016/1/1 | T-SHIRT | COTTON | L | BLUE |
| A | 30 | 2016/2/2 | JACKET | COTTON | L | BLUE |
| B | 31 | 2016/3/3 | T-SHIRT | HEMP | M | RED |
| C | 30 | 2016/4/4 | DRESS SHIRT | COTTON | M | BLUE |
| A | 30 | 2016/5/5 | T-SHIRT | COTTON | L | BLUE |
| ⋮ | ⋮ | ⋮ | ⋮ | ⋮ | ⋮ | ⋮ |

FIG. 13

| USER | AGE | PURCHASE DATE | SIZE |
|---|---|---|---|
| A | 30 | 2016/1/1 | LARGE |
| B | 31 | 2016/2/2 | LARGE |
| C | 29 | 2016/3/3 | SMALL |
| D | 35 | 2016/2/5 | LARGE |
| E | 30 | 2016/4/4 | SMALL |
| ⋮ | ⋮ | ⋮ | ⋮ |

FIG. 14

| USER | NEAREST STATION | UPPER FLOOR/ LOWER FLOOR | BATH INFORMATION | ROOM TYPE | PURPOSE |
|---|---|---|---|---|---|
| A | TOKYO | UPPER FLOOR | WITH BATHTUB | SINGLE BED | BUSINESS TRIP |
| B | UENO | LOWER FLOOR | SHOWER ONLY | SINGLE BED | BUSINESS TRIP |
| C | TOKYO | UPPER FLOOR | SHOWER ONLY | SINGLE BED | LEISURE |
| A | AKIHABARA | UPPER FLOOR | WITH BATHTUB | SINGLE BED | BUSINESS TRIP |
| A | TOKYO | LOWER FLOOR | WITH BATHTUB | THREE-QUARTER BED | LEISURE |
| D | TOKYO | UPPER FLOOR | WITH BATHTUB | TWIN BED | LEISURE |
| E | SHINJUKU | UPPER FLOOR | SHOWER ONLY | SINGLE BED | BUSINESS TRIP |
| ⋮ | ⋮ | ⋮ | ⋮ | ⋮ | ⋮ |

METHOD OF OUTPUTTING RECOMMENDED ITEM AND RECOMMENDED ITEM OUTPUT DEVICE

CROSS-REFERENCE TO RELATED APPLICATION

This application is based upon and claims the benefit of priority of the prior Japanese Patent Application No. 2015-197961 filed on Oct. 5, 2015, and the prior Japanese Patent Application No. 2016-125300 filed on Jun. 24, 2016, the entire contents of which are incorporated herein by reference.

FIELD

A certain aspect of the embodiments is related to a method of outputting a recommended item, a non-transitory computer-readable storage medium, and a recommended item output device.

BACKGROUND

There have been conventionally known collaborative filtering methods as a technique that identifies an item that is more likely to attract the interest of a user who is searching for an item on Web pages or in a database and presents the identified item as a recommended item. One of the collaborative filtering methods identifies a similar user based on the information on the user and the item that the user has accessed, and presents the item that has been accessed by the similar user as a recommended item. Another one of the collaborative filtering methods identifies an item similar to the item that the user has accessed based on the similarity between items, and presents the similar item as a recommended item.

Japanese Patent Application Publication Nos. 2006-48320, 2011-135183, and 2012-22365 disclose techniques that recommend information relevant to the contents that the user is browsing.

SUMMARY

According to an aspect of the embodiments, there is provided a method of outputting a recommended item implemented by a computer, the method including: obtaining information on a search item selected by a user when the user searches for an item on an item search screen; storing the information on the search item obtained in the obtaining in a storage unit that stores information on a search item that a plurality of users have selected in the past with respect to each user; identifying a similar user to the user by referring to the storage unit; and outputting information on an item that the similar user has referred to in the past to the user as information on a recommended item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A illustrates a data structure of a characteristic item table, FIG. 5B illustrates a data structure of an evaluation value table, and FIG. 5C illustrates a data structure of a working table;

FIG. 6A illustrates a data structure of a group table, FIG. 6B illustrates a data structure of an access history table, and FIG. 6C illustrates a data structure of a timer variable table;

FIG. 12 is a diagram (No. 1) for describing a variation of the embodiment;

FIG. 13 is a diagram (No. 2) for describing another variation of the embodiment; and FIG. 14 is a diagram (No. 3) for describing another variation of the embodiment.

DESCRIPTION OF EMBODIMENTS

As described previously, one of the collaborative filtering methods identifies a similar user based on the information on the user and the item that the user has accessed, and presents the item that has been accessed by the similar user as a recommended item. Another one of the collaborative filtering methods identifies an item similar to the item that the user has accessed based on the similarity between items, and presents the similar item as a recommended item.

However, the above collaborative filtering methods present the recommended item without considering what feature attracts the interest of the user, and thus may fail to present an appropriate item as a recommended item.

Hereinafter, an exemplary embodiment of an information service system will be described in detail based on FIG. 1 through FIG. 11.

Figure 1:
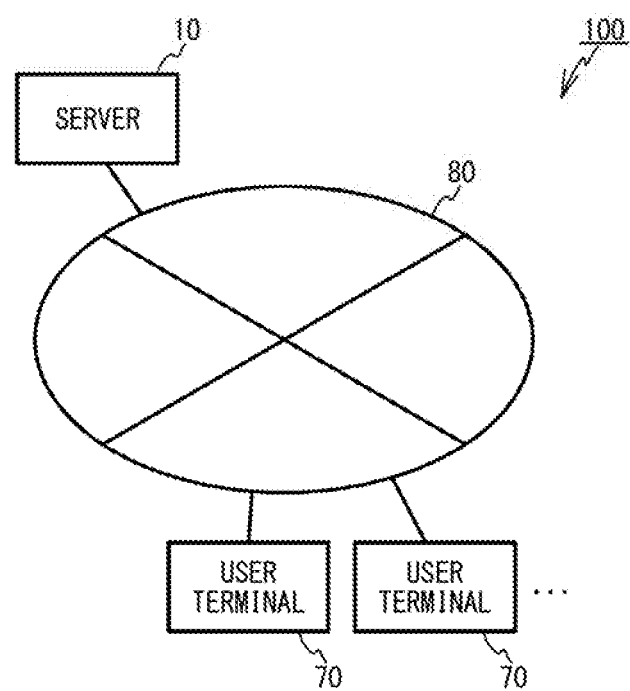
FIG. 1 schematically illustrates an information service system in accordance with an exemplary embodiment.

FIG. 1 schematically illustrates a configuration of an information service system 100 in accordance with the exemplary embodiment. The information service system 100 of the present embodiment provides information on items (e.g., items such as hard disk drives, Solid State Drives (SSDs), and diodes) to a user based on the search criteria input by the user. The information service system 100 also identifies an item to be recommended to the user (a recommended item), and provides the information on the identified recommended item to the user.

As illustrated in FIG. 1, the information service system 100 includes a server 10 as a recommended item output device, and user terminals 70. The server 10 and the user terminals 70 are connected to a network 80 such as the Internet.

Figure 2:
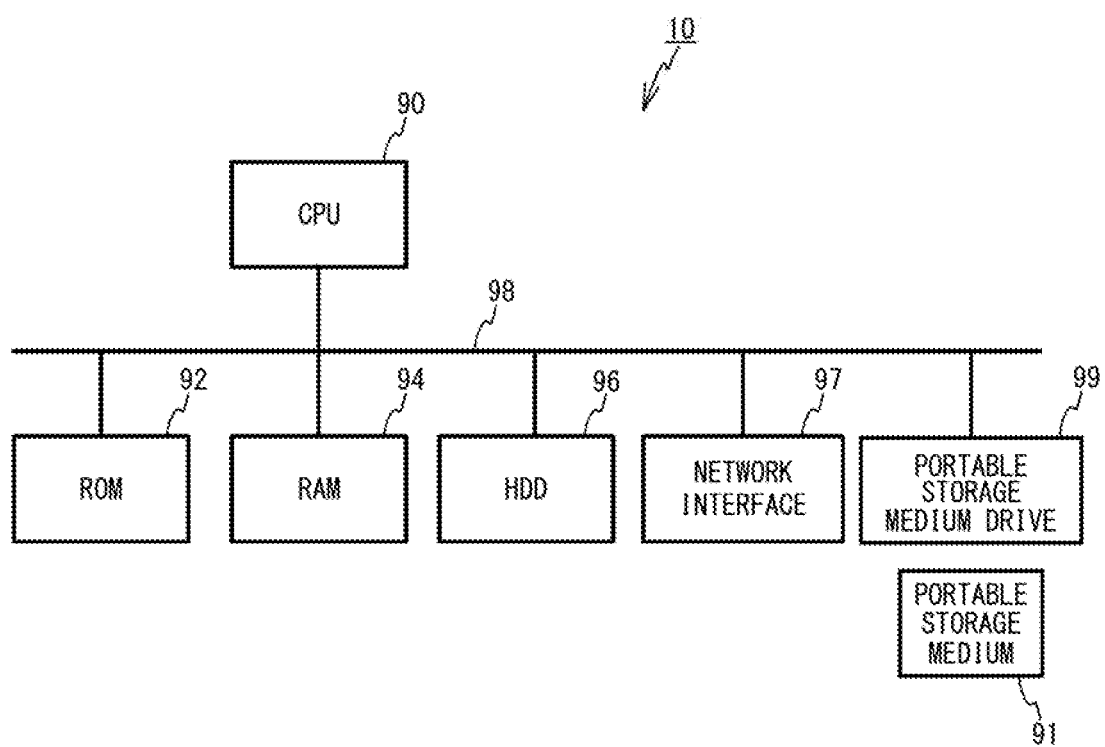
FIG. 2 illustrates a hardware configuration of a server.
Figure 3:
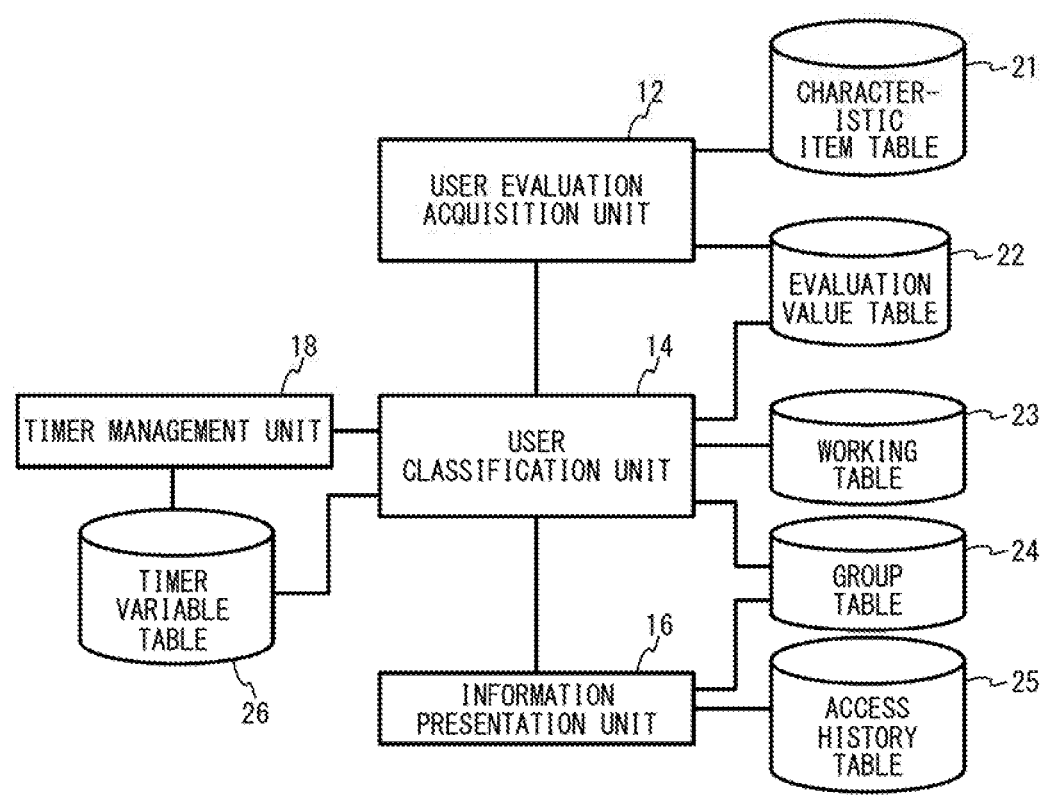
FIG. 3 is a functional block diagram of the server.

The server 10 searches for items based on the search criteria input in the user terminal 70, and outputs the search result to the user terminal 70. In addition, the server 10 identifies an item to be recommended to the user based on the search criteria input in the user terminal 70, and outputs the identification result to the user terminal 70. FIG. 2 illustrates a hardware configuration of the server 10. As illustrated in FIG. 2, the server 10 includes a Central Processing Unit (CPU) 90, a Read Only Memory (ROM) 92, a Random Access Memory (RAM) 94, a storage unit (here, a Hard Disk Drive (HDD)) 96, a network interface 97, a portable storage medium drive 99, and other components. The components of the server 10 are coupled to a bus 98. In the server 10, the execution of programs (including a recommended item output program), which are stored in the ROM 92 or the HDD 96 or read from a portable storage medium 91 by the portable storage medium drive 99, by the CPU 90 implements a user evaluation acquisition unit 12 as an acquisition unit and a memory processing unit, a user classification unit 14 as an identification unit and a deletion unit, an information presentation unit 16 as an output unit, and a timer management unit 18 illustrated in FIG. 3. FIG. 3 also illustrates tables stored in the HDD 96 or the like. The tables include a characteristic item table 21, an evaluation value table 22 as a storage unit, a working table 23, a group table 24, an access history table 25, and a timer variable table 26.

Figure 4:
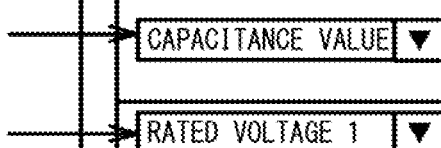
FIG. 4 illustrates a search I/F.

The user evaluation acquisition unit 12 monitors the operation by the user on a search Interface (I/F) (see FIG. 4) as a search screen displayed on the user terminal 70, and updates the evaluation value table 22 based on the operation. When updating the evaluation value table 22, the user evaluation acquisition unit 12 refers to the characteristic item table 21. The search I/F of FIG. 4 is intended to be used when, although the information on an item (an original item number and a classification code) has been input to search for substitute items (completely interchangeable parts) for the item, no completely interchangeable part is found. However, this does not intend to suggest any limitation. The search I/F may be displayed in response to the designation from the user when, although a substitute item for the item has been found, the user wants to update the criteria to perform a detail search. For example, the search I/F of FIG. 4 is a screen for the user to input search criteria (a handling classification, a package shape, the number of terminals) of items (e.g., diodes) corresponding to the original item number and the classification number to search for items that satisfy the search criteria.

Here, the characteristic item table 21 includes fields of "index" and "characteristic item" as illustrated in FIG. 5A. The field of "index" stores identification information assigned to each characteristic item, and the field of "characteristic item" stores the name of the characteristic item of an item selected as a search item in the search I/F. The characteristic item is contained in the field in which "capacitance value" or "rated voltage 1" indicated by the arrow is presented in the search I/F of FIG. 4, and represents the type of the characteristic (the characteristic type) of an item on which the user focuses attention. Specific values (16 V and the like) of "capacitance value" and "rated voltage 1" represent a "search value".

The evaluation value table 22 registers the number of times the user has selected each characteristic item on the search I/F with respect to each item to be searched for, and has a data structure illustrated in FIG. 5B. More specifically, the evaluation value table 22 includes fields of "user", "synchronization flag" and "characteristic item". The field of "user" stores the identification information of the user. The field of "synchronization flag" stores a flag that indicates whether a synchronization process is currently being executed. In the present embodiment, "FALSE" is stored as the synchronization flag when the synchronization process is being executed, while "TRUE" is stored as the synchronization flag when the synchronization process is not being executed. The field of "characteristic item" stores a value that indicates how many times each characteristic item has been selected by each user. The user evaluation acquisition unit 12 increments the value (an evaluation value) stored in the field of "characteristic item" by a value of 1 every time the user selects the corresponding characteristic item as a search item, and resets the value (returns the value to zero) when the search item is not selected for a predetermined period of time. Hereinafter, the "evaluation value" of the characteristic item is also called the "number of times of selection". The evaluation value table 22 is prepared with respect to each item to be searched for.

Back to FIG. 3, the user classification unit 14 creates the working table 23 based on the evaluation value table 22, divides similar users into groups based on the working table 23, and stores information on each group in the group table 24. Here, the working table 23 integrates information on the user of which the synchronization flag is "TRUE" in the evaluation value table 22 as illustrated in FIG. 5C. The group table 24 stores information on a group putting similar users together, and has a data structure illustrated in FIG. 6A. For example, the group table 24 includes fields of "group" and "belonging user" as illustrated in FIG. 6A. The field of "group" stores the identification information of a group, and the field of "belonging user" stores the identification information of the user belonging to each group.

The information presentation unit 16 refers to the group table 24 and the access history table 25 to determine an item to be recommended to the user, and outputs the result to the user terminal 70. Here, the access history table 25 manages the history of items that the user has accessed, and has a data structure illustrated in FIG. 6B. For example, the access history table 25 includes fields of "user" and "item" as illustrated in FIG. 6B. The field of "user" stores the identification information of the user, and the field of "item" stores the identification information of the item that each user has accessed.

When a timer variable, which is set with respect to each characteristic item, has become a predetermined value, the timer management unit 18 notifies the user classification unit 14 of this based on the timer variable table 26. Here, the timer variable table 26 manages the timer variables set with respect to each characteristic item of each user, and has a data structure illustrated in FIG. 6C. For example, the timer variable table 26 includes fields of "user", "characteristic item", and "timer variable". The field of "user" stores the identification information of the user, and the field of "characteristic item" stores the identification information of the characteristic item selected by the user. The field of "timer variable" stores the timer variable used to determine whether the time for the evaluation value table 22 to be reset has come.

Back to FIG. 1, the user terminal 70 is a terminal such as a Personal Computer (PC), displays the search I/F of FIG. 4 on a display unit, and transmits the search criteria input by the user through an input unit to the server 10. In addition, the user terminal 70 receives the search result based on the search criteria in the server 10, and displays the result on the display unit. Furthermore, the user terminal 70 receives the information on a recommended item from the server 10, and displays it on the display unit.

Process by the Information Service System

Next, the process executed by the information service system 100 will be described along the flowcharts of FIG. 7 through FIG. 10. The process of the server 10 is mainly described, and other drawings will be referred to when appropriate.

User Evaluation Acquisition Process

First, a user evaluation acquisition process by the server 10 will be described along the flowchart of FIG. 7. The user evaluation acquisition process of FIG. 7 is a process that compiles which characteristic item the user has selected on the search I/F.

Figure 7:
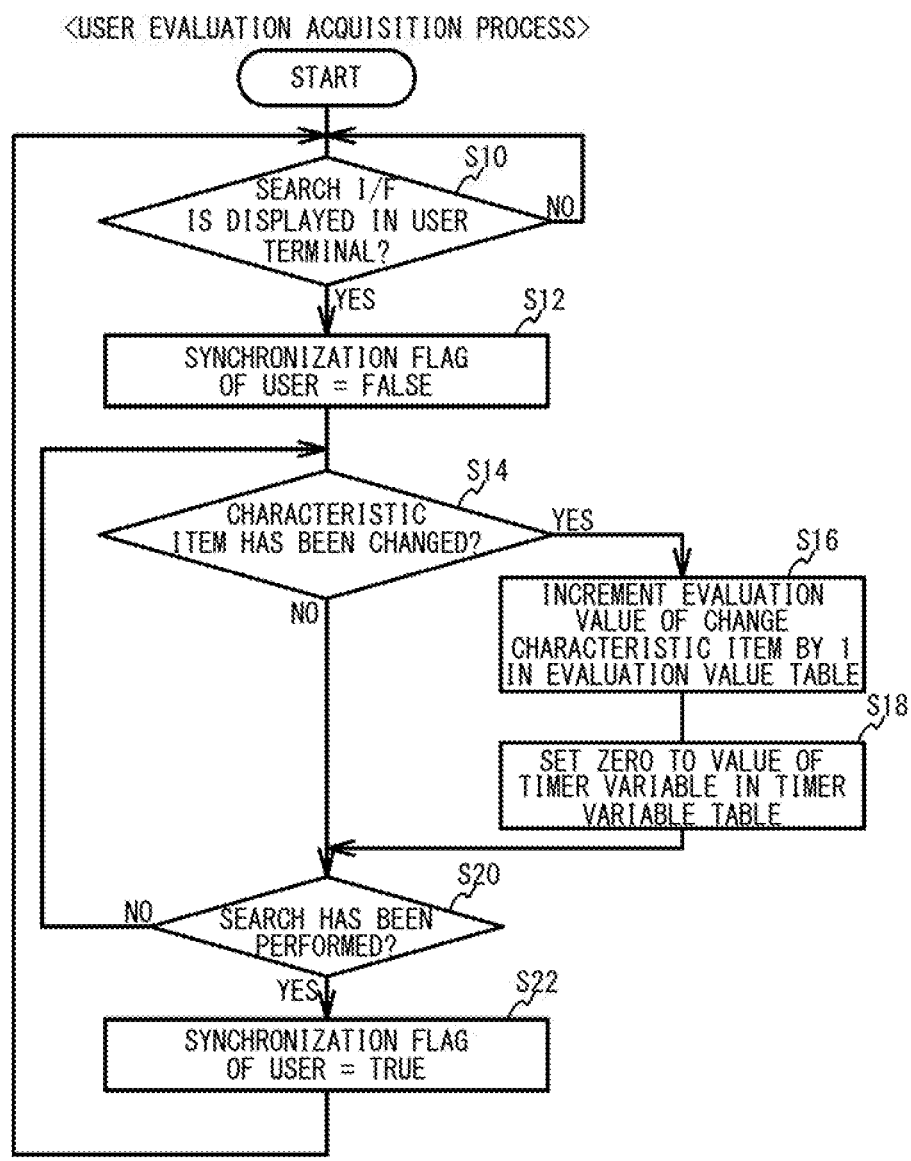
FIG. 7 is a flowchart of a user evaluation acquisition process.

In the process of FIG. 7, at step S10, the user evaluation acquisition unit 12 waits till the search I/F of FIG. 4 is displayed in any one of the user terminals 70. The search I/F of FIG. 4 is displayed when no completely interchangeable part is found although the information on an item (the original item number and the classification code) is input to search a substitute item for the item, or when the user wants to further perform a detail search by changing the criteria although a substitute item for the item has been found. The screen of the search I/F of FIG. 4 is transmitted to the user terminal 70 by the information presentation unit 16.

After the search I/F is displayed in the user terminal 70, the process moves to step S12, and the user evaluation acquisition unit 12 sets "FALSE" to the synchronization flag of the user who is using the user terminal 70 in which the search I/F has been displayed. In this case, the user evaluation acquisition unit 12 sets "FALSE" to the synchronization flag of the user in the evaluation value table 22 illustrated in FIG. 5B.

Next, at step S14, the user evaluation acquisition unit 12 determines whether the characteristic item has been changed. Assume that the field indicated by the arrow in the search I/F of the FIG. 4 is blank at first. Thus, when the user selects one characteristic item as a search item in the field, or changes the characteristic item that was once selected, the determination at step S14 becomes YES.

When the determination at step S14 is NO, the process moves to step S20, while when the determination at step S14 is YES, the process moves to step S16.

At step S16, the user evaluation acquisition unit 12 increments the evaluation value (the number of times of selection) of the changed characteristic item in the evaluation value table 22 by a value of 1. For example, when a user U1 selects the characteristic item of index=B0, the user evaluation acquisition unit 12 changes the value of the characteristic item B0 of the user U1 from 2 to 3 in the evaluation value table 22 of FIG. 5B.

Then, at step S18, the user evaluation acquisition unit 12 sets zero to the value of the timer variable in the timer variable table 26. When the characteristic item after the change does not exist in the characteristic items associated with the user who performed a search in the timer variable table 26, the characteristic item after the change is added, and the value of the timer variable thereof is set to zero. Then, the user evaluation acquisition unit 12 moves to step S20.

At step S20, the user evaluation acquisition unit 12 determines whether the search has been performed. That is, the user evaluation acquisition unit 12 determines whether the user has pushed a "search" button in the search I/F of the FIG. 4. When the determination at step S20 is NO, the process returns to step S14, while when the determination is YES, the process moves to step S22.

At step S22, the user evaluation acquisition unit 12 sets the synchronization flag of the user back to "TRUE" in the evaluation value table 22. After step S22, the process returns to step S10, and the user evaluation acquisition unit 12 repeats the above described processes.

Timer Management Process

Next, a timer management process by the timer management unit 18 will be described along the flowchart of FIG. 8. The process of FIG. 8 manages the timer variables in the timer variable table 26. The process of FIG. 8 is simultaneously executed in parallel to the process of FIG. 7.

Figure 8:
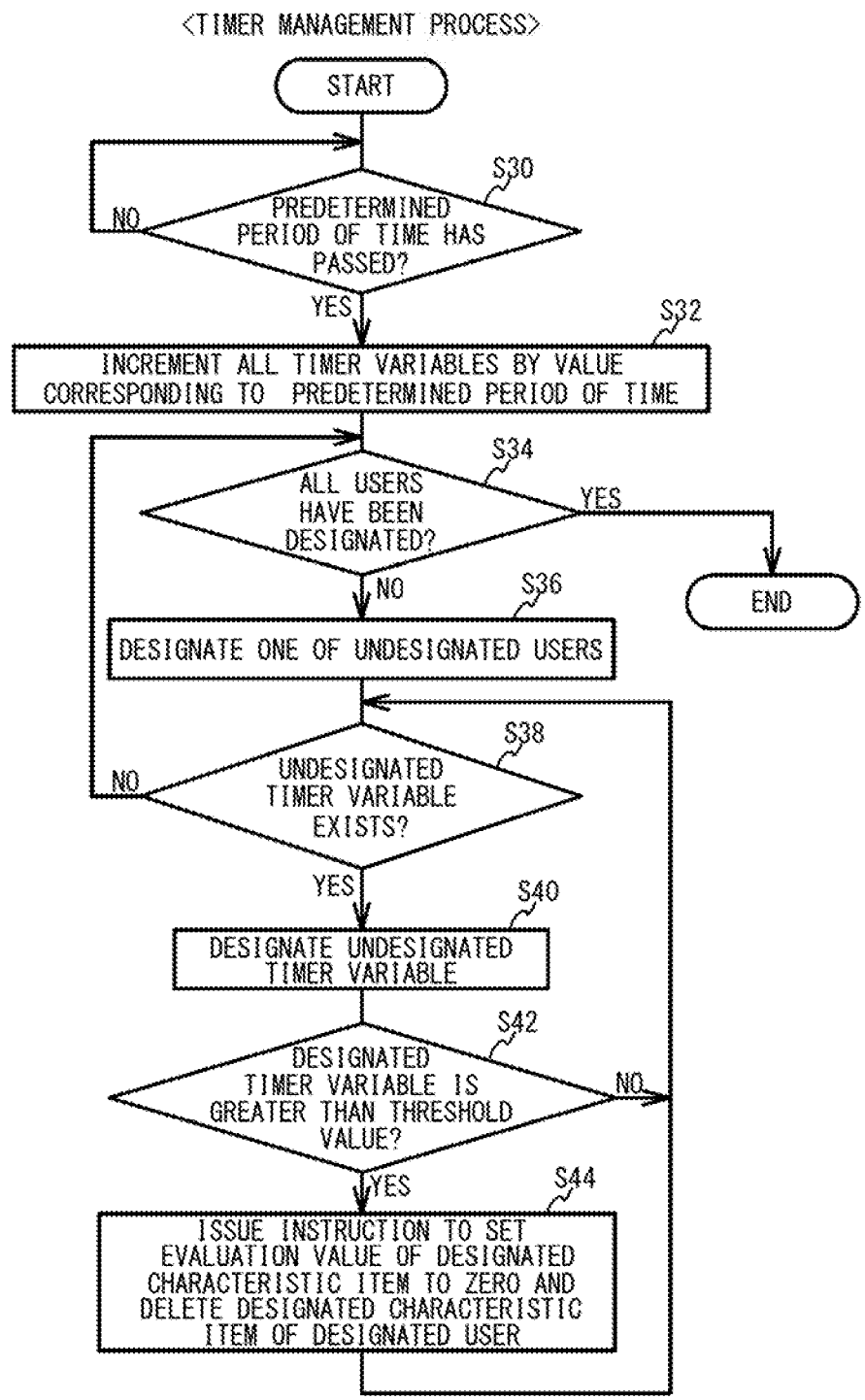
FIG. 8 is a flowchart of a timer management process.

In the process of FIG. 8, at step S30, the timer management unit 18 waits till a predetermined period of time has passed. In the present embodiment, the predetermined period of time is one second. When the determination at step S30 becomes YES, and the process moves to step S32, the timer management unit 18 increments all timer variables by a value corresponding to the predetermined period of time. When the predetermined period of time is one second, the timer management unit 18 increments all timer values in the timer variable table 26 (FIG. 6C) by a value of one.

Then, at step S34, the timer management unit 18 determines whether all users have been designated. Here, no one is yet designated. Accordingly, the process moves to next step S36, and the timer management unit 18 designates one user among undesignated users.

Next, at step S38, the timer management unit 18 determines whether an undesignated timer variable exists among the timer variables of the designated user. When the determination at step S38 is NO, the process returns to step S34, while when the determination is YES, the process moves to step S40.

At step S40, the timer management unit 18 designates one of undesignated timer variables. At step S42, the timer management unit 18 determines whether the designated timer variable is greater than a threshold value. When the determination is NO, the process returns to step S38, while when the determination is YES, the process moves to step S44.

Here, the threshold value is determined based on the unit price (e.g., the average) of the item that the user is searching for. For example, when a predetermined fixed time interval is represented by GLOBAL_UNIT_FLUSHTIME, and the unit price of the item is represented by ITEM_COST, a threshold value CONST_TIME is represented by, for example, the following equation 1.

$$\text{CONST\_TIME} = \text{GLOBAL\_UNIT\_FLUSHTIME} \times \text{ITEM\_COST} \quad (1)$$

The time to reset the number of times of selection of the characteristic item can be appropriately set by setting a less threshold value with respect to an item with a lower unit price and a greater threshold value with respect to an item with a higher unit price as in the above equation 1. For example, an item with a low unit price is frequently replaced in design and parts are frequently discontinued. Thus, the number of times of selection of the focused characteristic item needs to be determined at short time intervals. Accordingly, a short reset time is set with respect to an item with a low unit price. An item with a high unit price remains unchanged, for example, is not replaced for a long time. Thus, the number of times of selection of the focused characteristic item may be determined at long time intervals. Accordingly, a long reset time is set with respect to an item with a high unit price.

When the determination at step S42 is YES, and the process moves to step S44, the timer management unit 18 instructs the user classification unit 14 to set zero to the evaluation value (the number of times of selection) of the characteristic item designated by the designated user in the evaluation value table 22. The user classification unit 14 sets zero to (resets) the evaluation value of the designated characteristic item in accordance with the instruction. In addition, the timer management unit 18 deletes the designated characteristic item of the designated user from the timer variable table 26.

The process then returns to step S38. When an undesignated timer variable still exists (S38: YES), the timer management unit 18 designates the timer variable (S40), and executes the processes based on the comparison with the threshold value (S42, S44). After all time variables of the designated user have been designated (S38: NO), the process moves to step S34. The timer management unit 18 designates a next undesignated user (S36), and executes the processes same as the above described processes (S38 through S44).

As described above, after all users and all timer variables have been designated, the determination at step S34 becomes YES, and the entire process of FIG. 8 ends. The process of FIG. 8 is repeatedly executed. That is, the processes after step S32 are repeatedly executed at predetermined time intervals (at one-second intervals in the present embodiment).

Recommended Item Presentation Process

Figure 9:
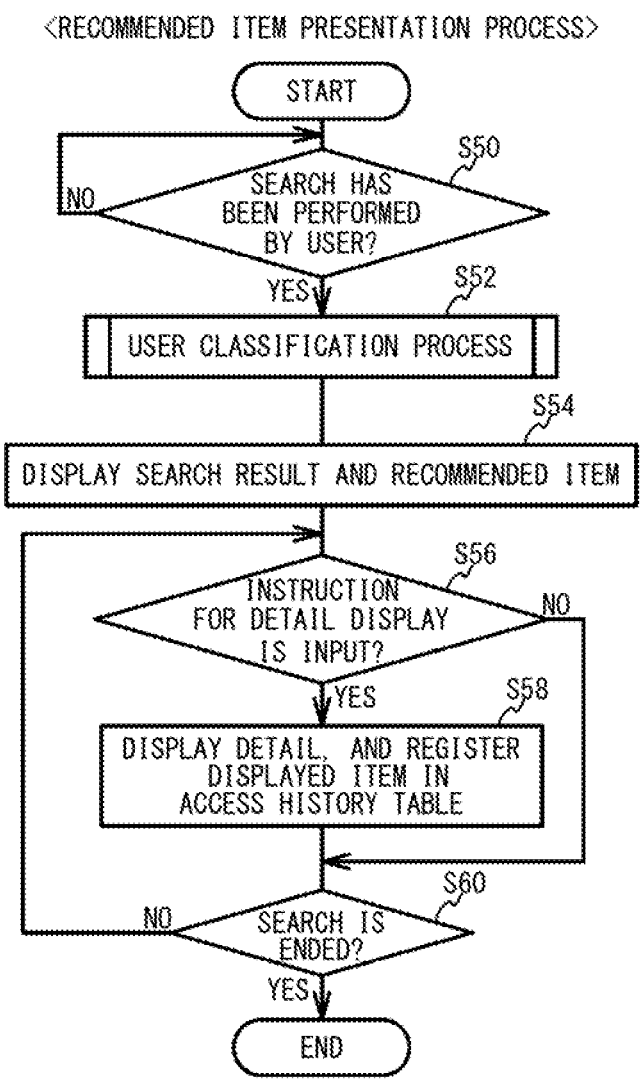
FIG. 9 is a flowchart of a recommended item presentation process.
Figure 10:
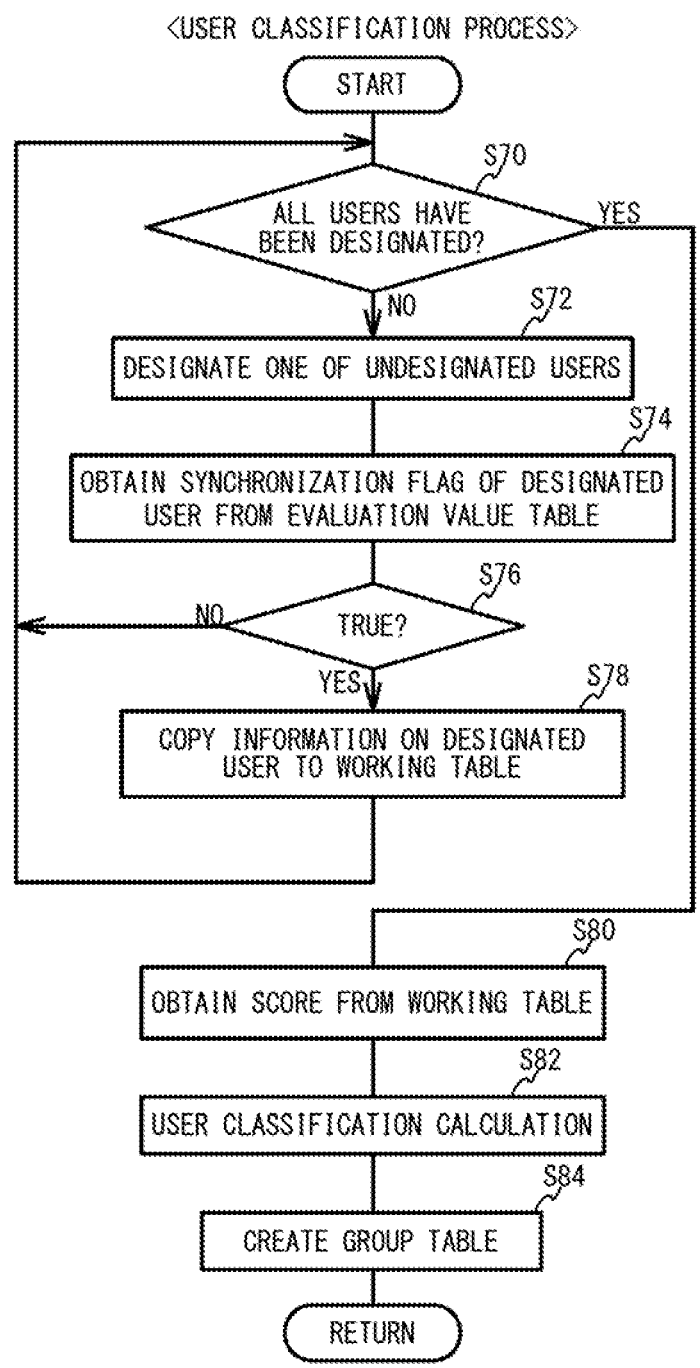
FIG. 10 is a flowchart of a user classification process.

Next, a recommended item presentation process by the user classification unit 14 and the information presentation unit 16 will be described along flowcharts of FIG. 9 and FIG. 10. The processes of FIG. 9 and FIG. 10 present the information on a searched item and the information on a recommended item to the user. This process is simultaneously executed in parallel to the user evaluation acquisition process (FIG. 7) and the timer management process (FIG. 8) described previously.

In the process of FIG. 9, at step S50, the user classification unit 14 waits till a search has been performed by the user. That is, when the user pushes the "search" button on the search I/F of FIG. 4, the user classification unit 14 moves to step S52.

At step S52, the user classification unit 14 executes a subroutine: a user classification process. At step S52, the process along the flowchart of FIG. 10 is executed.

User Classification Process (S52)

In the process of FIG. 10, at step S70, the user classification unit 14 determines whether all users have been designated. When the determination at step S70 is NO, the process moves to step S72, and the user classification unit 14 designates one of undesignated users.

Next, at step S74, the user classification unit 14 obtains the synchronization flag of the designated user from the evaluation value table 22. Next, at step S76, the user classification unit 14 determines whether the obtained synchronization flag is "TRUE". When the determination at step S76 is NO, the process returns to step S70, while when the determination is YES, the process moves to step S78.

At step S78, the user classification unit 14 copies the information on the designated user to the working table 23. More specifically, the user classification unit 14 copies the information on the designated user in the evaluation value table 22 to the working table 23 except the synchronization flag. Then, the process returns to step S70.

At step S70, the above described processes (S70 through S78) are repeatedly executed. When all users have been designated, the determination at step S70 becomes YES, and the user classification unit 14 moves to step S80. The working table 23 stores data that is retrieved from the evaluation value table 22 and of which the synchronization flag is "TRUE" as described above. That is, the working table 23 can be a part of the evaluation value table 22.

At step S80, the user classification unit 14 obtains a score (the evaluation value (the number of times of selection) of the characteristic item) from the working table 23. Next, at step S82, the user classification unit 14 executes a user classification calculation. In this case, the user classification unit 14 classifies users based on the number of times of selection of the characteristic item by each user with an algorithm of, for example, a Self-Organizing Map (SOM), and identifies similar users. Alternatively, the user classification unit 14 may classify users by a Support Vector Machine (SVM).

Hereinafter, the SOM algorithm executed by the user classification unit 14 will be described. The SOM algorithm is a type of neural network, has a double structure including an input layer and a competitive layer, and is a model that expresses the similarity of given input information by the distance between neurons on the competitive layer. Neurons (nodes) of the competitive layer are arranged in a two-dimensional lattice shape.

(a) First, the user classification unit 14 initializes reference vectors $m_i$ (the number of times of selection of the characteristic item in the present embodiment) of all nodes i (users in the present embodiment) on the competitive layer to random values.

(b) Next, the user classification unit 14 sets data randomly selected from input data (the number of times a randomly selected user has selected the characteristic item) as an input vector x.

(c) Next, the user classification unit 14 calculates the Euclidean distances between the input vector x and the reference vectors $m_i$ of the nodes i on the competitive layer with the following equation 2, and finds a winner node c of which the distance is minimal. That is, the node of which the number of times of selection of the characteristic item is most similar to the number of times the randomly selected user has selected the characteristic item is determined as the winner node c. In the following equation 2, i meets the condition: i=1, 2, 3, . . . , M.

$$|x-m_c|=\min|x-m_i| \qquad (2)$$

Here, for example, the distance calculated from the numbers of times of selection of the characteristic items A0 through E0 by a user U0 and the numbers of times of selection of the characteristic items A0 through E0 by a user U1 in FIG. 5B can be expressed by the following equation 3.

$$\{(3-4)^2+(0-2)^2+(7-5)^2+(0-3)^2+(4-5)^2\}^{1/2} \approx 5.2 \qquad (3)$$

Moreover, for example, the distance calculated from the numbers of times of selection of the characteristic items A0 through E0 by the user U0 and the numbers of times of selection of the characteristic items A0 through E0 by the user U2 in FIG. 5B can be expressed by the following equation 4.

$$\{(3-5)^2+(0-0)^2+(7-3)^2+(0-0)^2+(4-2)^2\}^{1/2} \approx 3.5 \qquad (4)$$

When the Euclidean distance is calculated, a weighted Euclidean distance can be calculated by weighting each characteristic item. For example, when the weighting based on the selection frequency of the characteristic item is applied (the weight is increased as the selection frequency increases), the value calculated by dividing the number $N_j$ of times of selection of the characteristic item j by all users by the number $N_{all}$ of times of selection of all characteristic items can be used as a weight $w_j$ as expressed by the following equation 5.

$$w_j=N_j/N_{all} \qquad (5)$$

The use of the above weight $w_j$ increases the effect of the characteristic item selected by many users on the distance, and decreases the effect of the characteristic item hardly selected by users on the distance.

In contrast, for example, when the weight is increased as the selection frequency decreases, the value expressed by the following equation 6 may be used as a weight $w_j$.

$$w_j = \{1-(N_j/N_{all})\} \quad (6)$$

The characteristic item selected by many users is automatically reflected to the distance, but the characteristic item hardly selected is less reflected when the distance is calculated. However, in practice, the difference in the characteristic item between users means the most to the calculation of the distance. Therefore, the use of the weight $w_j$ expressed by the above equation 6 increases the effect, on the Euclidean distance, of the difference in number of times each user has selected the characteristic item with a low selection frequency.

For example, assume that the weight of the characteristic item A0 of FIG. 5B is 0.3, the weight of B0 is 0.2, the weight of C0 is 0.1, the weight of D0 is 0.3, and the weight of E0 is 0.1. In this case, the distance calculated from the numbers of times of selection of the characteristic items A0 through E0 by the user U0 and the number of times of selection of the characteristic items A0 through E0 by the user U1 in FIG. 5B can be expressed by the following equation 7.

$$\{0.3\times(3-0)^2+0.2\times(0-2)^2+0.1\times(7-5)^2+0.3\times(0-3)^2+ 0.1\times(4-5)^2\}^{1/2} \approx 2.6 \quad (7)$$

In addition, for example, the distance calculated from the numbers of times of selection of the characteristic items A0 through E0 by the user U0 and the numbers of times of selection of the characteristic items A0 through E0 by the user U2 in FIG. 5B can be expressed by the following equation 8.

$$\{0.3\times(3-5)^2+0.2\times(0-0)^2+0.1\times(7-3)^2+0.3\times(0-0)^2+ 0.1\times(4-2)^2\}^{1/2} \approx 1.4 \quad (8)$$

The comparison between the values of the above equations 5 and 6 and the values of the above equations 7 and 8 reveals that the magnitude relationship of the distance remains the same between the case where the weight is used and the case where the weight is not used.

(d) Then, the user classification unit 14 updates the reference vectors $m_i$ of the winner node c and the nodes neighboring (around) the winner node c in the competitive layer based on the following equation 9. When the reference vector $m_i$ of the node neighboring the winner node c is updated by the following equation 9, the change in the reference vector $m_i$ by the update decreases as the distance increases and the change in the reference vector $m_i$ by the update decreases as the number of times of updating increases.

$$m_i(t+1) = m_i + h_{ci}(t)m_i[x(t) - m_i(t)] \quad (9)$$

Here, $h_{ci}$ is called a neighborhood function, and is defined by a Gaussian function such as the equation 10.

$$h_{ci}(t) = \alpha(t) + h_{ci}(t)\exp\left(\frac{|r_c - r_i|^2}{2\sigma^2}\right) \quad (10)$$

The repetition of the above described (a) through (d) achieves the self-organization.

Figure 11:
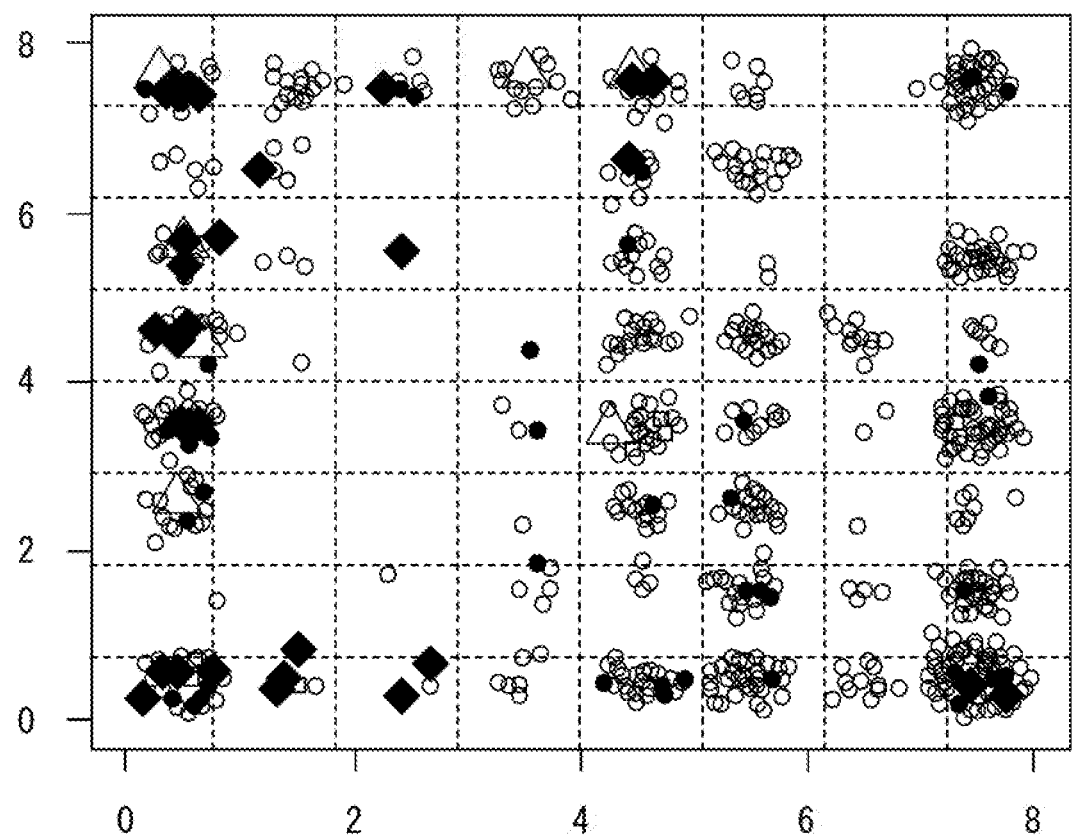
FIG. 11 illustrates a self-organization map.

FIG. 11 illustrates a result of the user classification with use of the SOM. In FIG. 11, each dot represents a user. The set of users are presented by displacing the users from the center of the grid to express the set. In the case of FIG. 11, users are classified into 8×8 grids. Thus, the users contained in the same grid are assumed to belong to the same group, and the users in the same group are defined as similar users. In addition, the less distance between grids represents the higher similarity between user groups. In FIG. 11, users represented by the same mark are users belonging to the same department. At the early phase in the self-organization map, the beginning weight of each user is often numbered randomly, but the beginning weight may be determined by taking into account the characteristic item with a high update frequency with respect to each user.

Next, at step S84, the user classification unit 14 creates the group table 24. More specifically, the user classification unit 14 gives identification information to each group containing similar users, and stores the identification information of the users belonging to the group in the group table 24 with respect to the identification information of the group. When the above process is executed, the entire process of FIG. 10 ends, and the process moves to step S54 of FIG. 9.

At step S54, the information presentation unit 16 executes a process for displaying a search result and a recommended item. More specifically, the information presentation unit 16 searches an unillustrated item DB that stores detail information on items, and transmits the information on the item that satisfies the search criteria input on the search I/F to the user terminal 70 of the user who performed the search as a search result. In addition, the information presentation unit 16 extracts, from the group table 24, a similar user to the user who has performed the search, and obtains the information on the item that the similar user has accessed from the access history table 25. The information presentation unit 16 then transmits the information on the item that is not included in the search result out of the obtained information on the items to the user terminal 70 of the user who performed the search as the information on a recommended item.

The information presentation unit 16 may output the information on the item that agrees with the search item (the characteristic item) selected and the search value input by the user on the search I/F as the information on a recommended item among information on the items that the similar user has accessed.

Then, at step S56, the information presentation unit 16 determines whether the instruction for detail display is input. When the determination at step S56 is NO, the process moves to step S60. On the other hand, when the search result or any one of recommended items is selected by the user, and the instruction for displaying the detail information on the item is thereby issued, the determination at step S56 becomes YES, and the process moves to step S58.

At step S58, the information presentation unit 16 obtains the detail information on the selected item from the item DB not illustrated, and transmits the information to the user terminal 70. The user terminal 70 displays the received information on the display unit. In addition, the information presentation unit 16 registers the item of which the detail information is displayed in the access history table 25. After the process of step S58, the process moves to step S60.

At step S60, the user classification unit 14 determines whether the search is ended. When the determination at step S60 is NO, the process returns to step S56, while when the determination is YES, the entire process of FIG. 9 ends.

Specific Example

Here, a specific example will be described. An exemplary case where a candidate for substitution (a substitute candidate) of a zener diode is searched for as an item will be described. When searching for the candidate for substitution of a zener diode, a user selects the characteristic item (the number of pins, a package, a failure rate, lifetime, zener voltage, and the like) as a search item on the search I/F, and inputs a specific value (a search value) of the selected characteristic item.

In the server 10, the user classification unit 14 obtains the characteristic item (e.g., lifetime) selected by the user in the search I/F, and creates user groups with use of the self-organization map or the like based on the selected characteristic item (S80 through S84). The server 10 then extracts, from the access history table 25, the zener diode that a similar user to the user who performed the search has accessed in the past, and transmits the result to the user terminal 70 of the user who performed the search (S54). In this case, for example, when the user performed a search with the search criteria of "lifetime of 3 years or greater", only information on the zener diode that satisfies the search criteria of the lifetime of 3 years or greater among zener diodes that the similar user has accessed in the past may be transmitted to the user terminal 70.

Since the zener diode is frequently replaced, the threshold value of the timer variable used in the timer management process (FIG. 8) is set to a relatively small value (see step S42).

As described above, in this example, the information on the zener diode that a user whose trend in search (trend in selection of the characteristic item) is similar has accessed in the past is provided to the user who is searching for a zener diode. This configuration allows for the provision of appropriate information as the information on a recommended item. In fact, the self-organization map presented in FIG. 11 was obtained as a result of the operation of the information service system 100 by employees in several departments. This result reveals that the employee who selects the characteristic item same as the characteristic item selected by another user is not always an employee in the same department as the another user. Thus, determining the information on the item that the similar user based on the self-organization map has accessed in the past as a recommended item is more likely to provide the useful information fitting to the interest of the user to the user.

As described above in detail, in the present embodiment, the user evaluation acquisition unit 12 of the server 10 obtains the information on a search item (the characteristic item) selected when a user searched for an item on the search I/F (FIG. 4), which is used in searching for an item, and stores the obtained information in the evaluation value table 22 (S16). Then, the user classification unit 14 identifies a similar user to the user based on the evaluation value table 22 (S80 through S84). Furthermore, the information presentation unit 16 outputs, as the information on an item recommended to the user, information on the item that the similar user has referred to in the past (S54). This configuration can present, to the user, the information on the item that a user whose trend in search (trend in selection of the characteristic item) is similar to the user has referred to in the past as a recommended item. Accordingly, the information on the item appropriate as a recommended item (the item fitting to the request of the user) can be presented.

Here, when the similar user is identified based on the information on the user or the result of the selection of the item by the user, (1) an initial user cannot use the information service system because the information on the user and the result of the item selection are unknown, (2) the similar user cannot be extracted if the item accessed by the user is different, (3) the case where the user is not interested in an item itself but is interested in the feature amount of the item (the characteristic item) cannot be considered. In addition, when a recommended item is presented to the user based on the similarity between items, (1) a history of items that the user has accessed in the past is required, (2) which feature amount (the characteristic item) of the item attracts the interest of the user cannot be taken into account. In contrast, the present embodiment can take into account the interest of the user, and can present the information on an appropriate recommended item even to the initial user or the like.

In addition, the present embodiment can output, as the information on a recommended item, the information on the item identified by the characteristic item selected in the search I/F by the user and the search value among the items that the similar user has referred to in the past. Thus, the information on an item similar to the item that the user is searching for can be presented as the information on a recommended item.

In addition, the present embodiment deletes the evaluation value (the number of times of selection) of each characteristic item stored in the evaluation value table 22 based on the threshold value corresponding to the price of the searched item. This configuration allows the evaluation value to be reset at an appropriate time based on the replacement frequency of the item, the appearance frequency of a substitute item, or the like.

In addition, the present embodiment sets the synchronization flag of the user who is updating the evaluation value of the evaluation value table 22 to "FALSE", and thereby can prevent the evaluation value that is being updated from being used when the user groups are created.

In the above described embodiment, the access history table 25 may store the date and time when each user accessed each item last time, and it may be determined whether to present the information as information on a recommended item to the user based on the date and time. For example, only the information on an item of which the last access date and time is within a predetermined period of time may be presented as the information on a recommended item. Here, the predetermined period of time may be determined based on the kind of the item. For example, the item of which the unit price is highest and the item of which the unit prices is lowest are obtained from items stored in the access history table 25, and the average value of the unit prices is calculated. Then, a long predetermined period of time is set with respect to an item of which the unit price is higher than the average value, while a short predetermined period of time is set with respect to an item of which the unit prices is less than the average value. Such a configuration allows the user to be provided with the information on the item that the similar user has accessed within a short period of time in the past to the user as for inexpensive parts such as zener diodes (i.e., an item of which the replacement cycle is short). On the other hand, the information on the item that the similar user has accessed within a large period of time in the past can be provided to the user as for expensive parts (i.e., an item of which the replacement cycle is long). Accordingly, the information on an appropriate recommended item can be provided to the user in accordance with the replacement cycle of a commodity. The predetermined period of time may be set based on information other than the unit price (e.g., lifetime or failure rate).

In the above described embodiment, in addition to a recommended item, the trend in selection of the characteristic item of the similar user may be presented to the user.

The above described embodiment has described an exemplary case where the timer management unit 18 counts up the timer variable in the timer variable table 26 (S32), but does not intend to suggest any limitation. For example, when the characteristic item is changed, the timer variable of the timer variable table 26 may be set to a value equal to a threshold value determined with respect to each item at step S18, and the timer variable may be counted down at step S32. In this case, at step S42, it is determined whether the value of the timer variable becomes zero.

The above described embodiment has described an exemplary case where user groups are created every time the user performs a search with the search I/F, but does not intend to suggest any limitation. For example, the process of creating the user groups (S52) may be executed at predetermined time intervals separately from the process of FIG. 9.

The above described embodiment has described an exemplary case where an item to be searched for is a component such as a zener diode, but does not intend to suggest any limitation. For example, commodities on a typical EC site may be an item to be searched for. In this case, the server 10 creates the user groups based on the search item (the characteristic item) selected when the user searches for a commodity, and may present, to the user as a recommended commodity, the commodity that another user belonging to the user group has accessed. When the commodity is a hard disk drive, the characteristic item may be a rotational number, when the commodity is a curtain, the characteristic item may be a pattern or the like, and when the commodity is a cushion, the characteristic item may be a material or the like.

For example, assume that FIG. 12 illustrates the purchase history of clothing of each user on the EC site. In this case, the collaborative filtering method focuses on the high purchase frequency of T-shirts (the interest in T-shirts) of a user A who is to purchase a new article of clothing, and recommends, to the user A, the T-shirt purchased by another user (e.g., a user B in the same generation as the user A) who has purchased a T-shirt. In contrast, the method of the above described embodiment identifies a user similar to the user A based on the fact that the user A frequently selects the characteristic item "color" when the user A purchases clothing. When the user A selects "blue" as the characteristic item "color", a blue article of clothing (e.g., a blue dress shirt) purchased by a user similar to the user A (e.g., a user C) is recommended to the user A. Accordingly, since the information on an article of clothing that a user whose trend in search is similar to that of the user has purchased in the past can be presented to the user as recommended information. Therefore, the information fitting to the request of the user can be presented. In addition to the blue dress shirt purchased by the user C, the T-shirt purchased by the user B may be presented to the user A based on the collaborative filtering method. Information on the commodities other than clothing, for example, shoes and hats, can be presented as described above.

For example, assume that FIG. 13 illustrates the purchase history of a rice cooker of each user on the EC site. In this case, the collaborative filtering method will recommend a large rice cooker purchased by, for example, the user B of the same generation as the user A to the user A who is to purchase a new rice cooker because the user A purchased a large rice cooker in the past. In contrast, the method of the above described embodiment identifies a user similar to the user A (e.g., the user B and the user C) based on the fact that the user A frequently selects the characteristic item "size" when the user A purchases a rice cooker. Then, when the user A selects "large" as the characteristic item "size", the rice cooker that has been purchased by the user similar to the user A and of which the size is "large" is recommended to the user A. Alternatively, when the user A selects "small" as the characteristic item "size", the rice cooker that has been purchased by the user similar to the user A and of which the size is "small" is recommended to the user A. Accordingly, the information on the commodity that a user whose trend in search is similar to that of the user has purchased in the past can be presented to the user as recommended information. Therefore, the information fitting to the request of the user can be presented. Information on home appliances other than rice cookers and other commodities can be presented as described above.

In addition, for example, an item to be searched for may be tours on a site for searching for travel plans. For example, assume that FIG. 14 illustrates the reservation history of each user on a hotel booking site. The field of "purpose" in FIG. 14 stores the purpose for the accommodation selected by the user such as "business trip" or "leisure". In this case, the collaborative filtering method will recommend a hotel near Tokyo station booked by another user to the user A who frequently books hotels near Tokyo station and is going to newly book a hotel. In contrast, the method of the above described embodiment identifies a user similar to the user A (e.g., the users B and C) based on the fact that the user A frequently selects the characteristic item "purpose" when the user A books a hotel. Then, when the user A selects "leisure" as the characteristic item "purpose", the hotel that has been booked by the user similar to the user A and of which the purpose is "leisure" is recommended to the user A. Thus, the information fitting to the request of the user can be presented.

Furthermore, an item to be searched for may be, for example, information on houses for rent on a web site for searching for houses for rent. In this case, the search item (the characteristic item) may include a location, a rental fee, a room arrangement, a distance from a station, and other conditions.

In the above-described embodiments, the above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a DVD (Digital Versatile Disc) or a CD-ROM (Compact Disc Read Only Memory) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time when the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method of outputting a recommended item implemented by a computer, the method comprising:
obtaining information on a search item selected, from among a plurality of search items, by a first user when the first user searches for an item on an item search screen in which the first user sets a search criteria that is a combination of a search item and a search value set to the search item;
using a Self-Organizing Map algorithm or a Support Vector Machine to identify, from a plurality of second users, a third user having a trend in selection of a search item similar to a trend in selection of a search item of the first user, based on a number of times the first user has selected each of the plurality of search items when the search is executed and a number of times each of the plurality of second users has selected each of the plurality of search items in a past regardless of the search value set to the search item selected by the first user, the number of times the first user has selected each of the plurality of search items and the number of times each of the plurality of second users has selected each of the plurality of search items in the past being stored in a storage unit;
obtaining information on an item accessed in the past by the third user; and
outputting information on an item narrowed down, with use of the search value set to the search item selected by the first user, from the information on the item accessed in the past by the third user to the first user as information on a recommended item.

2. The method of claim 1, wherein
the outputting includes outputting information on an item identified from the search item selected on the item search screen by the first user and the search value of the search item input by the first user as the information on the recommended item among the information on the item accessed in the past by the third user.

3. The method of claim 1, further comprising:
deleting the number of times the first user has selected each of the plurality of search items and the number of times each of the plurality of second users has selected each of the plurality of search items in the past stored in the storage unit based on a time corresponding to a price of the item searched for by the first user.

4. The method of claim 1, wherein
the outputting includes outputting information on an item accessed by the third user within a period of time determined based on the item searched for by the first user to the first user as the information on the recommended item.

5. The method according to claim 1, wherein
the using includes using the Self-Organizing Map algorithm or the Support Vector Machine to classify the first user and the plurality of second users into a plurality of groups based on the number of times the first user has selected each of the plurality of search items when the search is executed and the number of times each of the plurality of second persons has selected each of the plurality of search items in the past, and identifying, as the third user, a user included in a first group, which includes the first user, of the plurality of groups.

6. The method according to claim 1, wherein
the using includes using the Support Vector Machine.

7. The method according to claim 1, wherein
the outputting includes outputting information on an item excluding an item searched based on the search criteria input by the first user from among the information on the item accessed in the past by the third user.

8. The method according to claim 1, wherein
the outputting includes outputting the information on the item narrowed down from the information on the item accessed in the past by the third user separately from a search result obtained by search using the search item selected by the first user and the search value set to the search item.

9. A non-transitory computer-readable storage medium storing a program causing a computer to execute a process, the process comprising:
obtaining information on a search item selected, from among a plurality of search items, by a first user when the first user searches for an item on an item search screen in which the first user sets a search criteria that is a combination of a search item and a search value set to the search item;
using a Self-Organizing Map algorithm or a Support Vector Machine to identify, from a plurality of second users, a third user having a trend in selection of a search item similar to a trend in selection of a search item of the first user, based on a number of times the first user has selected each of the plurality of search items when the search is executed and a number of times each of the plurality of second users has selected each of the plurality of search items in a past regardless of the search value set to the search item selected by the first user, the number of times the first user has selected each of the search items and the number of times each of the plurality of second users has selected each of the plurality of search items in the past being stored in a storage unit;
obtaining information on an item accessed in the past by the third user; and
outputting information on an item narrowed down, with use of the search value set to the search item selected by the first user, from the information on the item accessed in the past by the third user to the first user as information on a recommended item.

10. The non-transitory computer readable storage medium of claim 9, wherein
the outputting includes outputting information on an item identified from the search item selected on the item search screen by the first user and the search value of the search item input by the first user as the information on the recommended item among the information on the item accessed in the past by the third user.

11. The non-transitory computer readable storage medium of claim 9, further comprising:
deleting the number of times the first user has selected each of the plurality of search items and the number of times each of the plurality of second users has selected each of the plurality of search items in the past stored in the storage unit based on a time corresponding to a price of the item searched for by the first user.

12. The non-transitory computer readable storage medium of claim 9, wherein
the outputting includes outputting information on an item accessed by the third user within a period of time determined based on the item searched for by the first user to the first user as the information on the recommended item.

13. A recommended item output device comprising:
a memory; and
a processor coupled to the memory and configured to:
  obtain information on a search item selected, from among a plurality of search items, by a first user when the first user searches for an item on an item search screen in which the first user sets a search criteria that is a combination of a search item and a search value set to the search item;
  use a Self-Organizing Map algorithm or a Support Vector Machine to identify, from a plurality of second users, a third user having a trend in selection of a search item similar to a trend in selection of a search item of the first user, based on a number of times the first user has selected each of the plurality of search items when the search is executed and a number of times each of the plurality of second users has selected each of the plurality of search items in a past regardless of the search value set to the search item selected by the first user, the number of times the first user has selected each of the search items and the number of times each of the plurality of second users has selected each of the plurality of search items in the past being stored in a storage unit;
  obtain information on an item accessed in the past by the third user; and
  output information on an item narrowed down, with use of the search value set to the search item selected by the first user, from the information on the item accessed in the past by the third user to the first user as information on a recommended item.

14. The recommended item output device of claim 13, wherein
  the output unit outputs information on an item identified from the search item selected on the item search screen by the first user and the search value of the search item input by the first user as the information on the recommended item among the information on the item accessed in the past by the third user.

15. The recommended item output device of claim 13, further comprising
  a deletion unit that deletes the number of times the first user has selected each of the plurality of search items and the number of times each of the plurality of second users has selected each of the plurality of search items in the past stored in the storage unit based on a time corresponding to a price of the item searched for by the first user.

16. The recommended item output device of claim 13, wherein
  the output unit outputs information on an item accessed by the third user within a period of time determined based on the item searched for by the first user to the first user as the information on the recommended item.

* * * * *